United States Patent
Abrahamsson et al.

(10) Patent No.: US 10,113,900 B2
(45) Date of Patent: Oct. 30, 2018

(54) FIELD DEVICE WITH MULTIPLE PROTOCOL SUPPORT

(71) Applicant: Rosemount Tank Radar AB, Gothenburg (SE)

(72) Inventors: Par Abrahamsson, Linkoping (SE); Lars-Ove Larsson, Linkoping (SE)

(73) Assignee: ROSEMOUNT TANK RADAR AB, Gothenburg (SE)

(*) Notice: Subject to any disclaimer, the term of this patent is extended or adjusted under 35 U.S.C. 154(b) by 80 days.

(21) Appl. No.: 15/132,474

(22) Filed: Apr. 19, 2016

(65) Prior Publication Data
US 2017/0299419 A1    Oct. 19, 2017

(51) Int. Cl.
| | |
|---|---|
| *H04B 1/40* | (2015.01) |
| *G01F 23/284* | (2006.01) |
| *H04L 29/06* | (2006.01) |
| *G01S 13/88* | (2006.01) |
| *G01S 7/00* | (2006.01) |
| *G01F 23/00* | (2006.01) |

(52) U.S. Cl.
CPC .......... *G01F 23/284* (2013.01); *G01S 7/003* (2013.01); *G01S 13/88* (2013.01); *H04B 1/40* (2013.01); *H04L 69/18* (2013.01); *G01F 23/0076* (2013.01)

(58) Field of Classification Search
CPC .... G01F 23/0076; G01F 23/284; G01S 13/88; G01S 7/003; H04L 69/18; H04B 1/40
See application file for complete search history.

(56) References Cited

U.S. PATENT DOCUMENTS

| | | | | |
|---|---|---|---|---|
| 7,098,843 B2* | 8/2006 | Abrahamsson | ....... | G01F 23/284 342/124 |
| 7,308,825 B2* | 12/2007 | Hagg | .................... | G01F 23/284 73/290 R |
| 7,342,531 B2* | 3/2008 | Hagg | ..................... | G01F 23/18 324/629 |
| 7,355,548 B2* | 4/2008 | Larsson | ................ | G01F 23/284 342/124 |

(Continued)

OTHER PUBLICATIONS

"Rosmount TankRadar PRO", Technical Description 501026EN, Ed. 4, Rev. A, Feb. 2012, 32 pages.

(Continued)

*Primary Examiner* — Lisa Caputo
*Assistant Examiner* — Punam Roy
(74) *Attorney, Agent, or Firm* — Westman, Champlin & Koehler, P.A.

(57) ABSTRACT

A radar level gauge comprising a physical communication interface bi-directional communication of data structured according to either a first digital communication protocol or a second digital communication protocol, first communication circuitry for communicating measurement data from the field device, second communication circuitry for enabling configuration of the field device, protocol identification circuitry connected to the communication interface for intercepting data and configured to parse intercepted data to identify the digital communication protocol, and control circuitry for directing the intercepted data to one of the first and second communication circuitries based on the identified protocol.

18 Claims, 3 Drawing Sheets

(56) References Cited

U.S. PATENT DOCUMENTS

| | | | |
|---|---|---|---|
| 7,773,715 B2* | 8/2010 | Westfield | G01D 3/08 340/870.16 |
| 7,821,444 B2* | 10/2010 | Hall | G01F 23/284 342/124 |
| 8,804,750 B2 | 8/2014 | Takahashi | |
| 8,970,395 B2* | 3/2015 | Nilsson | G01F 23/284 340/870.01 |
| 9,389,113 B2* | 7/2016 | Jirskog | G01F 23/284 |
| 9,395,229 B2* | 7/2016 | Jirskog | G01F 23/284 |
| 9,518,857 B2* | 12/2016 | Edvardsson | H01Q 1/225 |
| 9,671,488 B2* | 6/2017 | Larsson | G01S 7/292 |
| 2006/0023795 A1 | 2/2006 | Kim | |
| 2006/0282580 A1 | 12/2006 | Russell, III et al. | |
| 2014/0266863 A1* | 9/2014 | Larsson | G01S 7/292 342/124 |
| 2016/0103006 A1 | 4/2016 | Edvardsson | |

OTHER PUBLICATIONS

Notification of Transmittal of the International Search Report and the Written Opinion of the International Searching Authority from PCT/EP2017/059286, dated Jun. 14, 2017.

* cited by examiner

FIELD DEVICE WITH MULTIPLE PROTOCOL SUPPORT

FIELD OF THE INVENTION

The present invention relates to a level gauge with multiple protocol support.

BACKGROUND OF THE INVENTION

Field devices such as radar level gauges, which are arranged to provide measurement data to a remote system, are normally configured upon installation to communicate digital data using a predefined communication protocol. Once installed, only this predefined protocol can be used. The protocol chosen will vary on the implementation.

For a field device connected to a two-wire control loop, and adapted to communicate analogue measurement data, digital data is often superimposed using Highway Addressable Remote Transducer (HART).

For a field device connected to a two wire control loop but adapted to communicate digital measurement data, the predefined protocol is often Foundation Fieldbus (FF).

Document U.S. Pat. No. 8,804,750 discloses a field device connected to a two-wire control loop, including circuitry for selectively communicating analogue measurement data or digital measurement data over the control loop. When analogue communication is used, digital HART communication is also enabled. The circuitry detects when a Fieldbus token is received, and then activates the Fieldbus communication circuitry.

Another category of field devices are not connected to a two-wire loop, but are configured to communicate on an exclusively digital interface. In such field devices, the protocol is often MODBUS.

A specific type of communication relates to configuration of a radar level gauge using a portable configuration tool. The configuration may for example relate to tank specific parameters, used by the radar level gauge in the gauging process. The digital HART protocol is commonly used for such configuration. In a situation where the radar level gauge is configured to communicate using a different digital protocol, e.g. MODBUS, it will not be possible to connect the portable configuration tool.

The prior art (e.g. U.S. Pat. No. 8,804,750) is limited to communicating on a two-wire control loop and does not provide a versatile connection of a configuration tool.

GENERAL DISCLOSURE OF THE INVENTION

It is an object of the present invention to eliminate, or at least mitigate, the above mentioned problem, and enable a versatile and flexible connection of a configuration tool to a field device.

This and other objects are achieved by a gauging system comprising a radar level gauge for determining a filling level of a product in a tank, a host system connectable to the radar level gauge to receive measurement data from the radar level gauge, and a portable configuration tool, external to the radar level gauge and connectable to the radar level gauge for configuring tank specific parameters. The radar level gauge includes transceiver circuitry configured to transmit an electromagnetic transmit signal and receive an electromagnetic return signal reflected from a surface of the product, a signal propagation device arranged to guide the transmit signal towards the surface, and to guide the return signal to the transceiver circuitry, and processing circuitry configured to determine the filling level based on a relationship between the electromagnetic transmit signal and the electromagnetic return signal. Further, the radar level gauge includes a physical communication interface allowing bi-directional communication of data structured according to either a first digital communication protocol or a second digital communication protocol, first communication circuitry for communicating measurement data from the radar level gauge using the first digital communication protocol when the communication interface is connected to the host system, second communication circuitry for enabling configuration of the field device using the second digital communication protocol when the communication interface is conductively connected to the configuration tool, protocol identification circuitry connected to the communication interface for intercepting data received by the communication interface and configured to parse intercepted data to determine if the intercepted data is structured according to the first digital communication protocol or according to the second digital communication protocol, and control circuitry for directing the intercepted data to the first communication circuitry when the intercepted data is structured according to the first digital communication protocol and to the second communication circuitry when the intercepted data is structured according to the second digital communication protocol.

According to the invention, the radar level gauge will thus have communication circuitry for two different types of digital communication using different protocols. One is used during normal operation to communicate measurement data, while the other is used during configuration to communicate with a configuration tool. The protocol identification circuitry will detect the protocol used by any data received by the communication interface, and the control circuitry will direct the data to the appropriate communication circuitry.

Many existing RLGs have all hardware required to communicate with several protocols, e.g. both MODBUS and HART, but are configured to use only one of them. According to the present invention, the RLG is provided with software, or a combination of software and hardware, to realize the protocol identification circuitry and the control circuitry, thereby enabling the RLG to communicate with two protocols depending on the circumstances.

As an example, the first protocol may be Fieldbus Foundation or MODBUS. As an example, the second protocol may be HART.

The physical communication interface is preferably configured exclusively for digital communication. In other words, it is not a two-wire control loop of the type that is common in conventional field installations, on which also analogue data is communicated. Instead, it may be a digital data bus, such as a serial bus.

According to one embodiment, the physical communication interface is selectively connectable only to one of the host system and the configuration tool. The invention then enables a user to freely choose if to connect a host system, e.g. for collecting measurement data, or to connect a configuration tool. The field device according to this embodiment of the invention will automatically adopt communication to the protocol used by the host or configuration tool.

According to another embodiment, the field device further comprises a gateway device connected to the physical communication interface, which gateway device has a first physical interface for connection to the host system and a second physical interface for connection to the configuration tool, wherein the first and second physical interfaces are simultaneously connectable. In this case, the host and the configuration toll can be simultaneously connected to the field device, and a user can use the configuration tool without disconnecting the host system. Again, the field device according to this embodiment of the invention will automatically adopt communication to the protocol used by the host or configuration tool.

The communication between the radar level gauge and the host and/or the configuration tool may be wireless. For this purpose, the communication interface may include a wireless communication interface to which the host and/or configuration tool is connectable.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Exemplary embodiments of the present invention will be discussed in the following with reference to a radar level gauging system. It is noted that the principles of the present invention are equally applicable to other types of field devices, including pressure gauges, flow meters, temperature gauges, etc.

Figure 1:
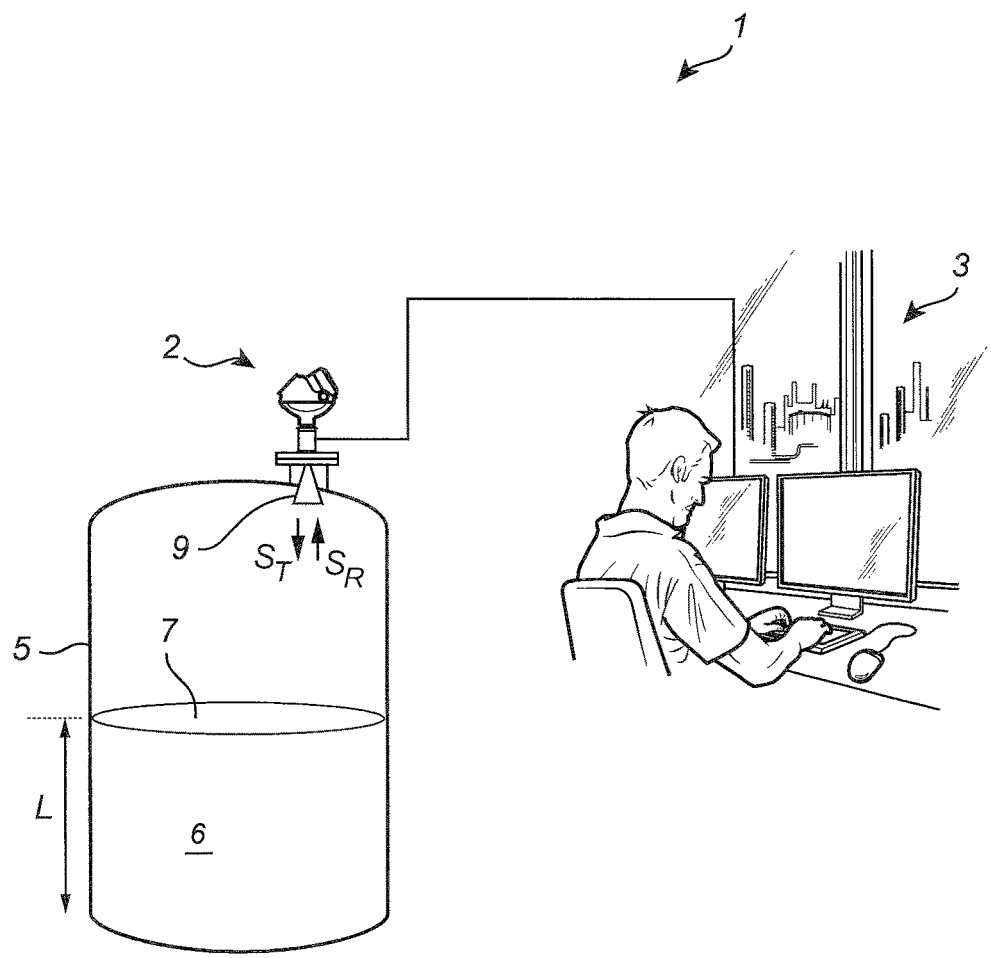
FIG. 1 schematically shows a radar level gauge mounted on a tank and in communication with a host system.

FIG. 1 schematically shows a level gauging system 1 based on the principle of detecting time of flight for a signal reflected by a surface in a tank 5. In the illustrated example, the signal is an electromagnetic signal in the radar frequency range, and the system 1 comprises a radar level gauge (RLG) 2 mounted on the tank 5. The level gauging system further comprises a host system 3, here located in a control room. The host system 3 can be any software application from technician's hand-held device to a plant's process control, asset management, safety or other system using any control platform. The tank 5 may be any container or vessel capable of containing a product to be measured, and is here illustrated as a large refinery tank (e.g. 30 m in diameter).

The radar level gauge 2 is installed to measure the filling level of a product 6 contained in the tank 5, by detecting the distance to an upper surface 7 of the product 6. Also a distance to a lower interface, such as an interface between an oil product and water below the oil, may be detected. In the illustrated example, the radar level gauge 2 is of non-contact type, and comprises a directional antenna 9 for emitting electromagnetic signals towards the surface 7.

As an alternative, the radar level gauge may be of guided wave radar (GWR) type, in which case the antenna 9 is replaced by some kind of transmission wave guide, e.g. a single conductor probe, extending into the product 6.

Figure 2A:
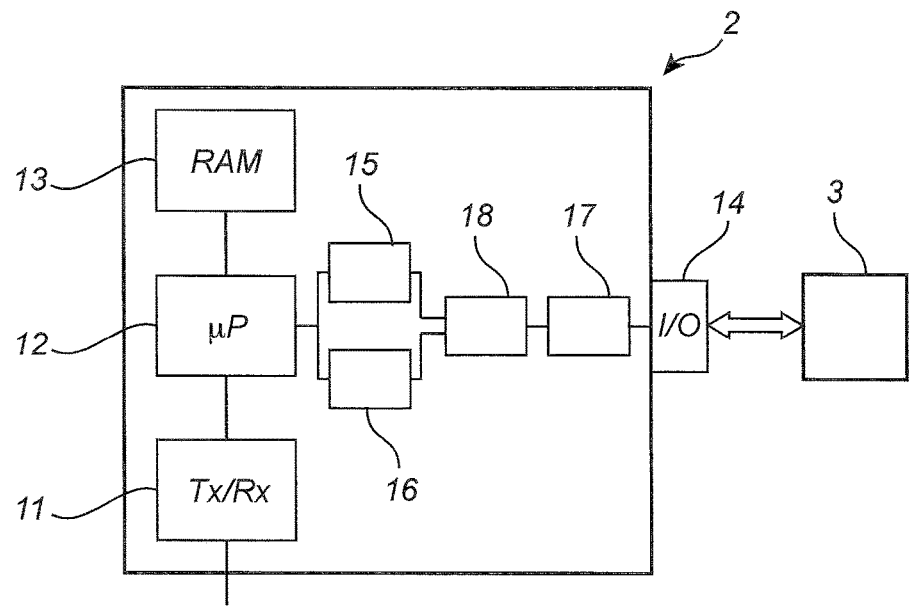
FIG. 2a shows a block diagram of selected components of the radar level gauge in FIG. 1 when connected to a host system.

With reference to FIG. 2a, the radar level gauge 2 here comprises a transceiver 11 electrically connected to the antenna 9, and processing circuitry 12 electrically connected to the transceiver 11. The RLG 2 further comprises an internal memory 13. The "transceiver" may be one functional unit capable of transmitting and receiving electromagnetic signals, or may be a system comprising separate transmitter and receiver units. The elements of the transceiver 11 are typically implemented in hardware, and form part of an integrated unit normally referred to as a microwave unit. The processing circuitry may include a combination of analogue processing realized in hardware, and digital processing realized embodied by software modules stored in the memory 13 and executed by an embedded processor. The invention is not restricted to the particular realization, and any implementation found suitable to realize the herein described functionality may be contemplated.

The transceiver 11 is configured to generate and transmit electromagnetic transmit signals $S_T$ which are emitted by the antenna 9 towards the surface 7 of the product 6. The transmit signal is typically a frequency modulated continuous wave (FMCW) or a pulsed signal comprising a train of separated pulses. Also various combinations of such transmit signals are known in the art. Electromagnetic return signals $S_R$ are caused by a reflection in the surface 7, and are received by the antenna 9 and fed back to the transceiver 11. The processing circuitry 12 is configured to determine the distance between a reference position at the top of the tank and the surface 7 by analyzing the transmit signal $S_T$ and the return signal $S_R$. Various signal processing for this purpose is known in the art, and typically include generation of an "echo curve", representing the amplitude of an echo as a function of the distance from the reference position. This echo curve is then analyzed to identify the echo caused by the surface (normally a relatively strong echo) and to determine the distance to the surface as the location of the peak of this surface echo. Based on the determined distance to the surface, generally referred to as ullage, and known dimensions of the tank 5, the filling level can then be deduced.

The RLG 2 further comprises a physical communication interface 14, here a serial data bus, allowing communication using a first bi-directional digital communication protocol and a second, bi-directional digital communication protocol. Examples of digital protocols used as the first protocol include Modbus, Profibus and Foundation Fieldbus. The second protocol may be HART.

The RLG 2 is provided with first and second communication circuitries 15, 16 which are configured to communicate using the first and second protocols, respectively. Protocol identification circuitry 17 and control circuitry 18 are connected between the communication circuitries 15, 16 and the interface 14, so as to intercept all data received by the interface before it reaches the communication circuitries 15, 16. The protocol identification circuitry 17 is configured to parse intercepted data to determine if the data is structured according to the first or the second digital communication protocol. The control circuitry 18 is configured to direct the data to the correct communication circuitry depending on which protocol is detected.

The identification of protocol can be based on various techniques. For example, the circuitry 17 can be adapted to recognize the framing of different protocols. Alternatively, a protocol may employ a specific, and identifiable, "start-of-message". The HART-protocol, for example, has an easily identifiable start-of-message. Yet another technique is to look at the cyclic redundancy check (CRC), which typically reveals which protocol that is being used. For example, the Modbus protocol has a CRC that can be used to reliably determine that received data uses the Modbus protocol.

In case of wired communication, the wires in the interface 14 may also be used to power the gauge. Alternatively, a separate power connection or internal power source may be provided. The communication of data may alternatively be wireless, and one of the communication circuitries 15, 16 may then advantageously be configured according to the so-called Wireless HART communication protocol (IEC 62591). In that case, the radar level gauge system 1 typically includes an internal, local power source such as a battery. The internal power source may be solar powered.

In FIG. 2a, the interface 14 is connected to the host system 3, which here communicates using Modbus. The protocol identification circuitry 17 will recognize that the data is structured according to the Modbus protocol, e.g. by identifying a Modbus preamble. Based on this determination, the control circuitry 18 will direct the data to the first communication circuitry 15, which is configured to communicate measurement data to the host system 3 using the first protocol, here Modbus.

Figure 2B:
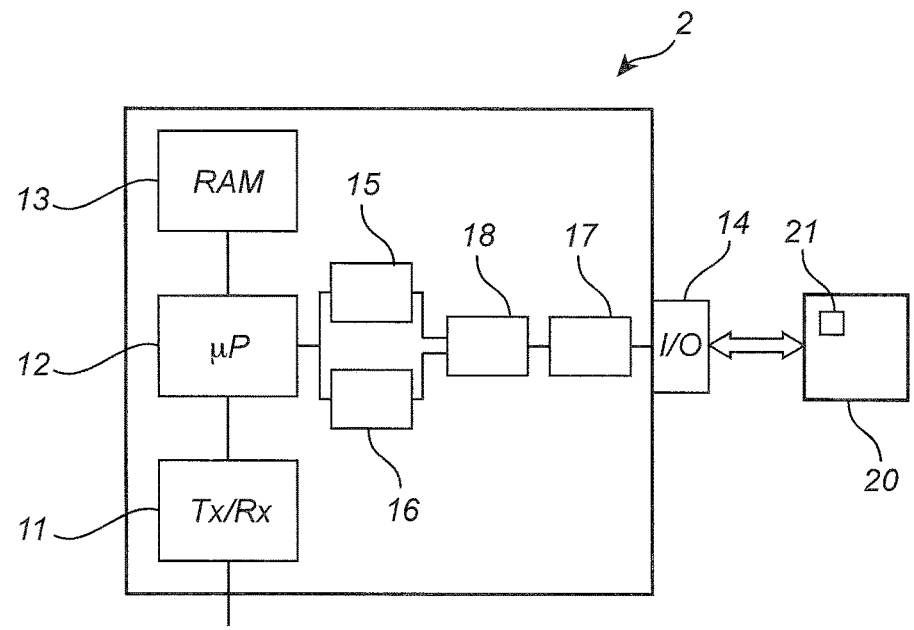
FIG. 2b shows a block diagram of selected components of the radar level gauge in FIG. 1 when connected to a configuration tool.

In FIG. 2b, the interface 14 is connected to a configuration tool 20. The configuration tool 20 is typically a portable unit, e.g. a laptop or other portable computing device, which is connected to communicate with the radar level gauge.

The HART (Highway Addressable Remote Transducer) protocol is a commonly used global standard for transmitting and receiving data from analog wires between the host system and a field device. More specifically, the HART protocol is a bi-directional communication protocol that provides data access between an intelligent device, e.g. a field device, and a host system. The HART protocol further includes a Device Description (DD) that transforms data into information so users can take full advantage of the field device. The Device Description included in the HART protocol makes HART very useful for configuration purposes. In one embodiment, the configuration tool 20 can be equipped with a HART communication circuitry 21 to enable HART communication via a RS485 interface, but other ways to allow HART communication are also possible.

The protocol identification circuitry 17 will now recognize that the data is structured according to the HART protocol, e.g. by identifying a HART preamble. Based on this determination, the control circuitry 18 will direct the data to the second communication circuitry 16, which is configured to communicate configuration data to the host system 3 using the second protocol, here HART.

Figure 3:
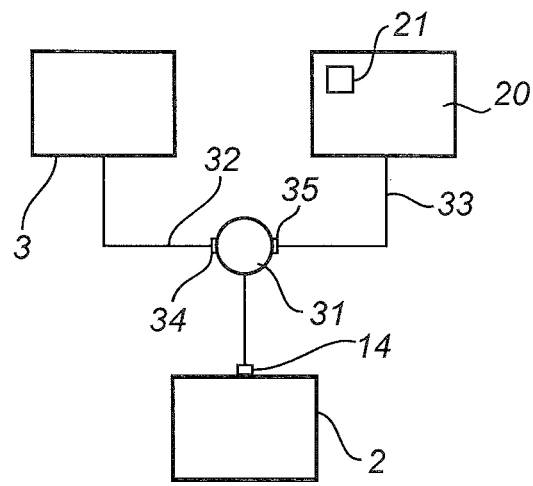
FIG. 3 schematically shows a radar level gauge selectively connectable to a host or to a configuration tool.
Figure 4:
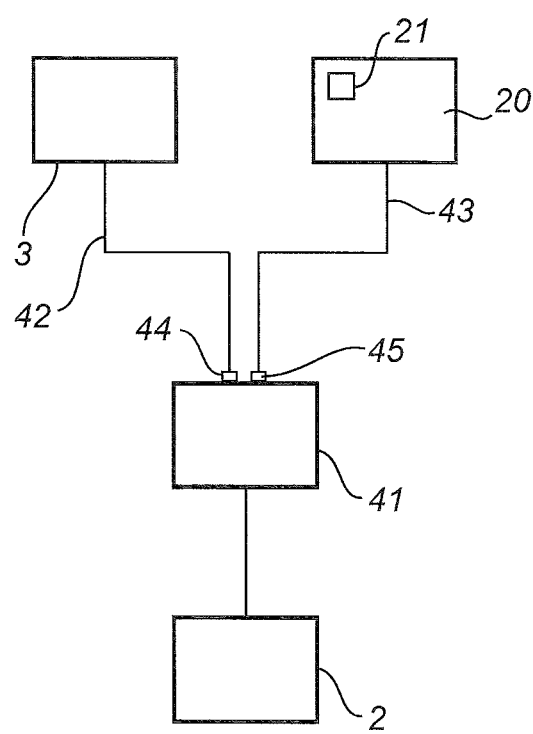
FIG. 4 schematically shows a radar level gauge having a gateway connected to a host and to a configuration tool.

FIGS. 3-4 illustrate two different ways to connect the configuration tool 20 to the RLG 2.

In FIG. 3, the host 3 and the tool 20 are connected to the RLG 2 one at a time via some kind of switch 31. In a very simple case, the switch is embodied by simply connecting only one of the host 3 and the tool 20 to the physical interface 14. For example, the physical interface 14 may be a RS485 interface (also known as ANSI/TIA/EIA-485 standard) to which a cord 32 of the host 3 is connected during operation of the gauge. During configuration, the cord 32 is disconnected, and a cord 33 of the configuration tool is connected instead.

Alternatively, the switch 31 is embodied as an actual switching device. For example, such a switching device may have two RS485 interfaces 34, 35, to which the cord 32 and the cord 33 are both connected. The switch 31 can then be operated between a first state, in which the first interface is conductively connected to the interface 14, and a second state in which the second interface is conductively connected to the interface 14.

In FIG. 4, the host 3 and the tool 20 are both connected simultaneously to the RLG 2 via a gateway 41. The Gateway may be for example an FCU2460. In this case, a cord 42 of the host 3 is connected to a first input terminal 44 of the gateway 41, while a cord 43 of the tool 20 is connected to a second input terminal 45 of the gateway 41. The two input terminals 44, 45 may be identical, e.g. RS485 interfaces, or they may be different, e.g. one RS485 interface and a BELL-standard interface.

The interface 41 is configured to ensure that the input terminals 44, 45 both are connected to the interface 14, for simultaneous connection of the host 3 and the configuration tool 20. According to this embodiment, the host system 3 needs not be disconnected during configuration of the RLG using the tool 20.

The person skilled in the art realizes that the present invention by no means is limited to the preferred embodiments described above. On the contrary, many modifications and variations are possible within the scope of the appended claims. For example, the details of the field device may be different than that disclosed herein. Also, other digital protocols than those disclosed may be used without affecting the principles of the invention. Further, the physical interface 14 may comprise a wireless communication interface, to enable wireless communication with the host system 3 and/or the configuration tool 20.

What is claimed is:

1. A level gauging system, the gauging system comprising:
   a radar level gauge for determining a filling level of a product in a tank;
   a host system connectable to the radar level gauge to receive measurement data from the radar level gauge; and
   a portable configuration tool, which is external to the radar level gauge and connectable to the radar level gauge for configuring tank specific parameters;
   said radar level gauge including:
   transceiver circuitry configured to transmit an electromagnetic transmit signal and receive an electromagnetic return signal reflected from a surface of the product;
   a signal propagation device arranged to guide said transmit signal towards said surface, and to guide said return signal to said transceiver circuitry;
   processing circuitry configured to determine said filling level based on a relationship between the electromagnetic transmit signal and the electromagnetic return signal;
   a physical communication interface allowing bi-directional communication of data structured according to either a first digital communication protocol or a second digital communication protocol;
   first communication circuitry for communicating measurement data from the radar level gauge using said first digital communication protocol when said communication interface is connected to the host system;
   second communication circuitry for enabling configuration of the radar level gauge using said second digital communication protocol when said communication interface is conductively connected to the configuration tool;
   protocol identification circuitry connected to said communication interface for intercepting data received by said communication interface from at least one of said host system and said portable configuration tool connected to said physical communication interface, and configured to parse intercepted data to determine if said intercepted data is structured according to said first digital communication protocol or according to said second digital communication protocol; and control circuitry for directing the intercepted data to said first communication circuitry when said intercepted data is structured according to said first digital communication protocol and to said second communication circuitry when said intercepted data is structured according to said second digital communication protocol.

2. The system according to claim 1, wherein the physical communication interface is configured exclusively for digital communication.

3. The system according to claim 2, wherein the physical communication interface is a digital data bus, e.g. a serial bus.

4. The system according to claim 3, wherein said physical communication interface is a RS485 interface.

5. The system according to claim 1, wherein said physical communication interface is selectively connectable to only one of said host system and said configuration tool.

6. The system according to claim 1, further comprising a gateway device connected to said physical communication interface, said gateway device having a first physical interface for connection to said host system and a second physical interface for connection to said configuration tool, said first and second physical interfaces are simultaneously connectable.

7. The system according to claim 6, wherein said first and second physical interface are exclusively digital interfaces.

8. The system according to claim 6, wherein said first and second physical interfaces are identical.

9. The system according to claim 6, wherein at least one of said first and second physical interfaces is one of a RS485 interface and a BELL-standard interface.

10. The system according to claim 1, wherein the first digital protocol is MODBUS.

11. The system according to claim 1, wherein the second digital protocol is HART.

12. The system according to claim 1, wherein the radar level gauge further comprises a local power source, configured to provide operating power to the radar level gauge.

13. The system according to claim 1, wherein the physical communication interface includes a wireless communication interface and wherein said host system is connectable to said wireless communication interface.

14. A method for communicating between a radar level gauge and one of:

a host system for receiving measurement data from the radar level gauge, and a portable configuration tool, which is external to the radar level gauge, for configuring tank specific parameters, the method comprising:

providing a physical communication interface allowing bi-directional communication of data structured according to either a first digital communication protocol or a second digital communication protocol;

providing first communication circuitry for communicating measurement data from the radar level gauge using said first digital communication protocol when said communication interface is connected to the host system, and second communication circuitry for enabling configuration of the radar level gauge using said second digital communication protocol when said communication interface is conductively connected to the configuration tool;

connecting said physical communication interface to at least one of one of said host system and said portable configuration tool;

intercepting data received by said communication interface from one of said host system and said portable configuration tool connected to said physical communication interface;

parsing intercepted data to determine if said intercepted data is structured according to said first digital communication protocol or according to said second digital communication protocol; and directing the intercepted data to said first communication circuitry when said intercepted data is structured according to said first digital communication protocol and to said second communication circuitry when said intercepted data is structured according to said second digital communication protocol.

15. The method according to claim 14, wherein said physical communication interface is connected to only one of said host system and said configuration tool.

16. The method according to claim 14, wherein the first digital protocol is MODBUS.

17. The method according to claim 14, wherein the second digital protocol is HART.

18. The method according to claim 14, further comprising connecting said host system to a wireless communication interface.

* * * * *

UNITED STATES PATENT AND TRADEMARK OFFICE
CERTIFICATE OF CORRECTION

PATENT NO. : 10,113,900 B2
APPLICATION NO. : 15/132474
DATED : October 30, 2018
INVENTOR(S) : Par Abrahamsson and Lars-Ove Larsson It is certified that error appears in the above-identified patent and that said Letters Patent is hereby corrected as shown below:

On the Title Page

Item (56) In the U.S. References:
"2006023795 A1 2/2006 Kim" should read --20030023795 A1 1/2003 Packwood et al.--

Signed and Sealed this
Seventh Day of May, 2019

Andrei Iancu
*Director of the United States Patent and Trademark Office*